(12) United States Patent
Cohen

(10) Patent No.: US 7,559,645 B2
(45) Date of Patent: Jul. 14, 2009

(54) EYEGLASS TEMPLE INCORPORATING DECORATIVE ARTICLE

(76) Inventor: Haim Cohen, Rietgors 173 B, 2991 MP, Barendrecht (NL)

(*) Notice: Subject to any disclaimer, the term of this patent is extended or adjusted under 35 U.S.C. 154(b) by 0 days.

(21) Appl. No.: 11/390,052

(22) Filed: Mar. 27, 2006

(65) Prior Publication Data
US 2007/0222940 A1 Sep. 27, 2007

(51) Int. Cl.
*G02C 11/02* (2006.01)
(52) U.S. Cl. .......................... 351/52; 351/61
(58) Field of Classification Search ............... 351/41, 351/51, 52, 158; 63/1.11, 1.18; 362/103, 362/104, 806
See application file for complete search history.

(56) References Cited
U.S. PATENT DOCUMENTS

| | | | | |
|---|---|---|---|---|
| 2,629,196 A | * | 2/1953 | Splaine | 351/83 |
| 2,766,541 A | * | 10/1956 | Quinones et al. | 351/51 |
| 2,960,787 A | * | 11/1960 | Quinones et al. | 351/52 |
| 2,981,022 A | * | 4/1961 | Anger, Jr. | 351/51 |
| 5,033,836 A | * | 7/1991 | Aoyama | 351/51 |
| 5,583,584 A | * | 12/1996 | Friedman | 351/52 |
| 5,627,607 A | * | 5/1997 | Grau | 351/52 |

\* cited by examiner

*Primary Examiner*—Huy Mai

(57) ABSTRACT

Disclosed is a means of attaching a decorative article to an eyeglass temple by forming one or more apertures within one or both of the temples for receiving and fixing the decorative article either semi-permanently or selectively replaceable from a plurality of decorative articles that includes beads, semi-precious stone(s) and precious stone(s). The aperture and decorative article can be adhesively bonded or releasably attached using a leaf-spring and mating cavity within the respective engaging surfaces of the temple aperture and decorative article. Additionally, the releasably attached decorative article and temple aperture can use magnetics by incorporating a magnet and ferromagnetic material within the respective engaging surfaces of the temple aperture and decorative article.

15 Claims, 13 Drawing Sheets

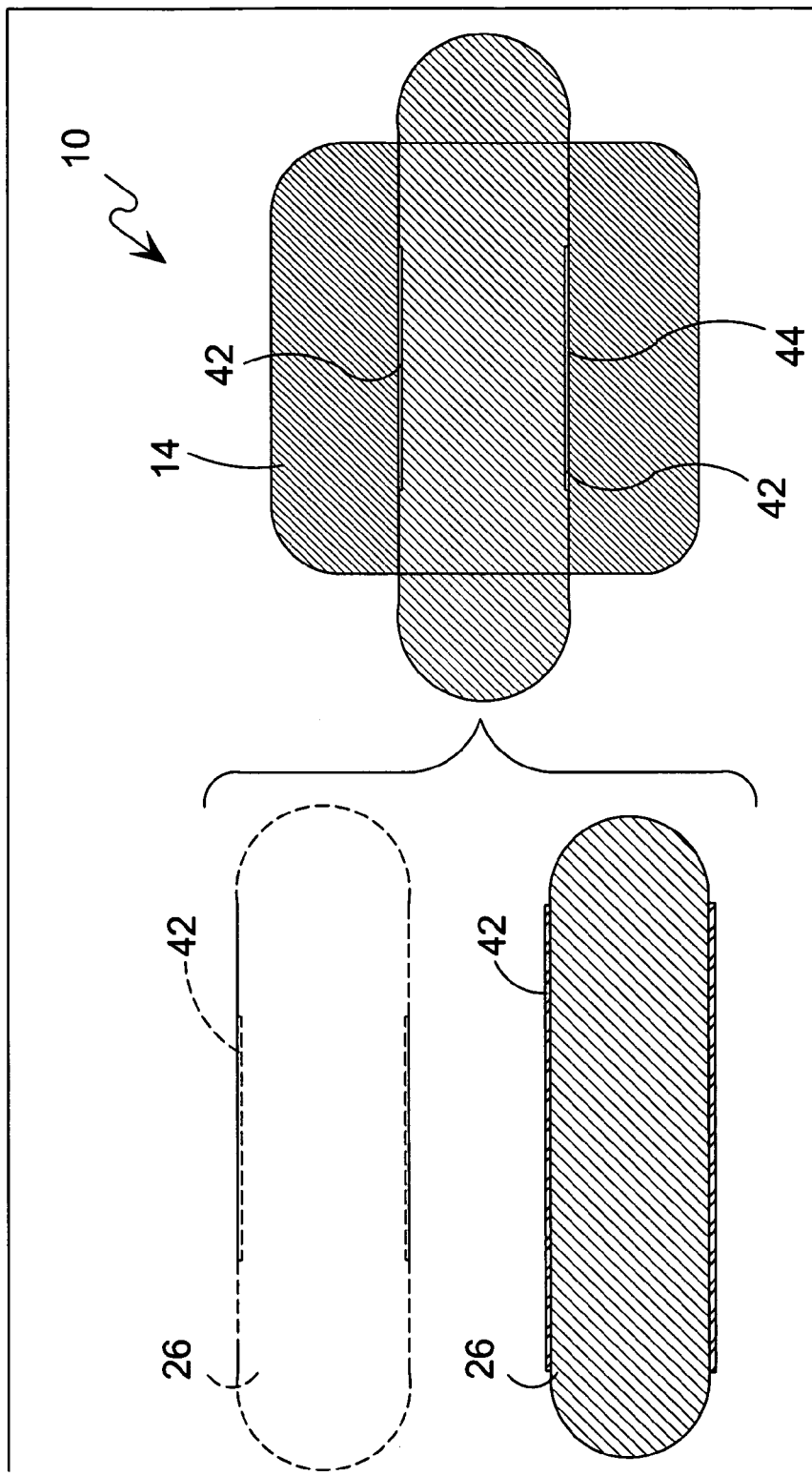

EYEGLASS TEMPLE INCORPORATING DECORATIVE ARTICLE

BACKGROUND OF THE INVENTION

Field of the Invention

Figure 1:
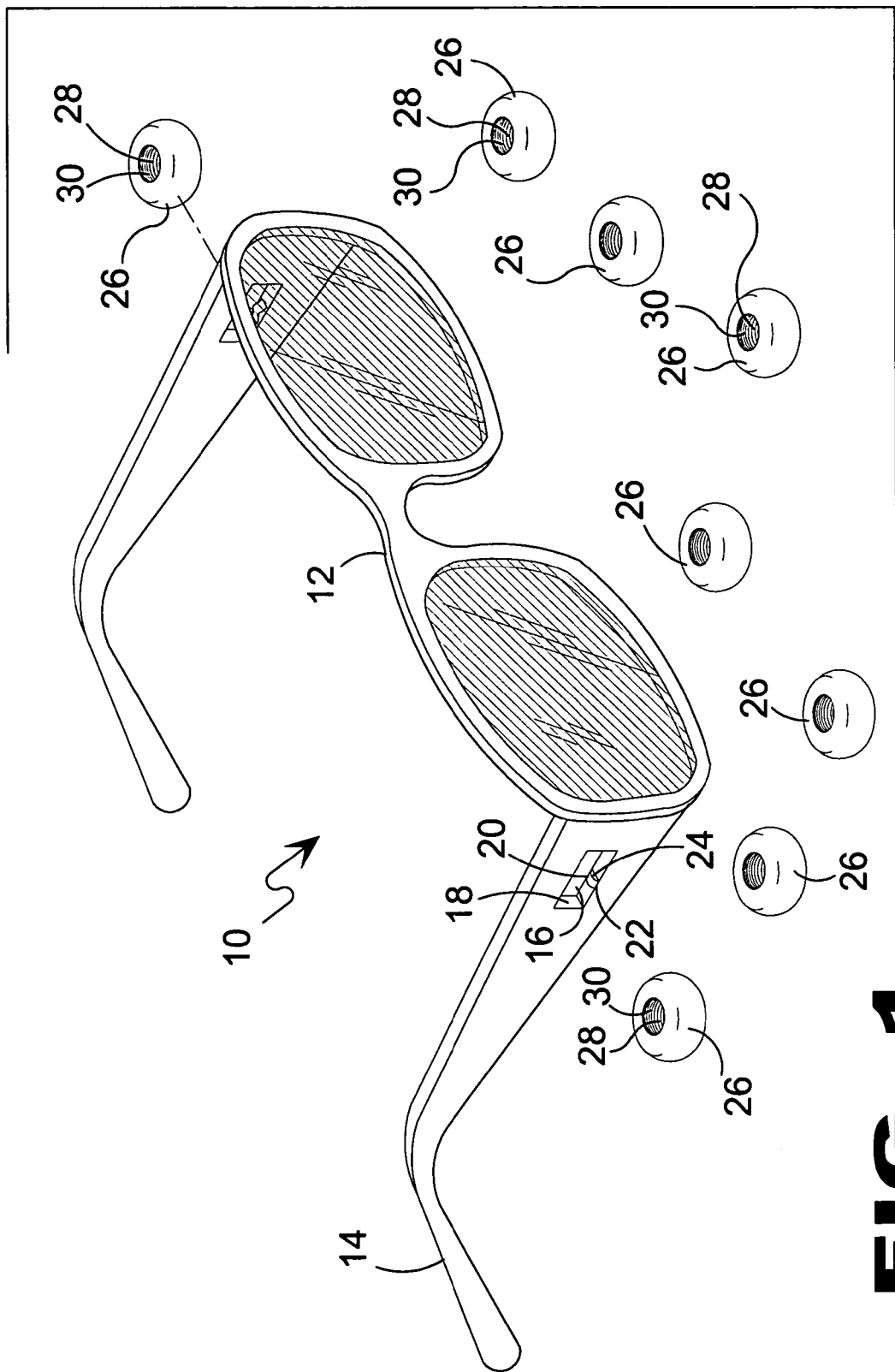

The present invention relates generally to eyeglasses and, more specifically, to a means of attaching a decorative article to an eyeglass temple by forming one or more apertures within one or both of the temples for receiving and fixing the decorative article either semi-permanently or selectively replaceable.

The decorative article or articles can be a bead, semi-precious stone(s) or precious stone(s) sized to fit within the temple aperture.

The aperture and decorative article(s) can be adhesively bonded for a semi-permanent attachment. As selectively replaceable attachment the instant invention provides for using a leaf-spring and mating cavity within the respective engaging surfaces of the temple aperture and decorative article or using magnetics by incorporating a magnet and ferromagnetic material within the respective engaging surfaces of the temple aperture and decorative article.

SUMMARY OF THE PRESENT INVENTION

A primary object of the present invention is to provide eyeglasses having an eyeglass temple with an aperture for placing a decorative article therein.

Another object of the present invention is to provide eyeglasses wherein the decorative element is predeterminedly fixed or selectively removable.

Yet another object of the present invention is to provide eyeglasses wherein the decorative element and temple aperture have at least one matingly engageable surface.

Still yet another object of the present invention is to provide eyeglasses wherein the engagable surfaces are adhesively bonded.

Another object of the present invention is to provide eyeglasses wherein the engagable surfaces are magnetically bonded and therefore releasable.

Yet another of the present invention is to provide eyeglasses wherein the engagable surfaces are mechanically bonded and therefore releasable.

Still yet another object of the present invention is to provide eyeglasses wherein the mechanical bond is a leaf-spring and aperture and therefore releasable by appropriate pressure.

Another object of the present invention is to provide eyeglasses wherein the engagable temple aperture and decorative element incorporate a magnet and ferromagnetic portions in opposing engagable surfaces.

Additional objects of the present invention will appear as the description proceeds.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Figure 2:
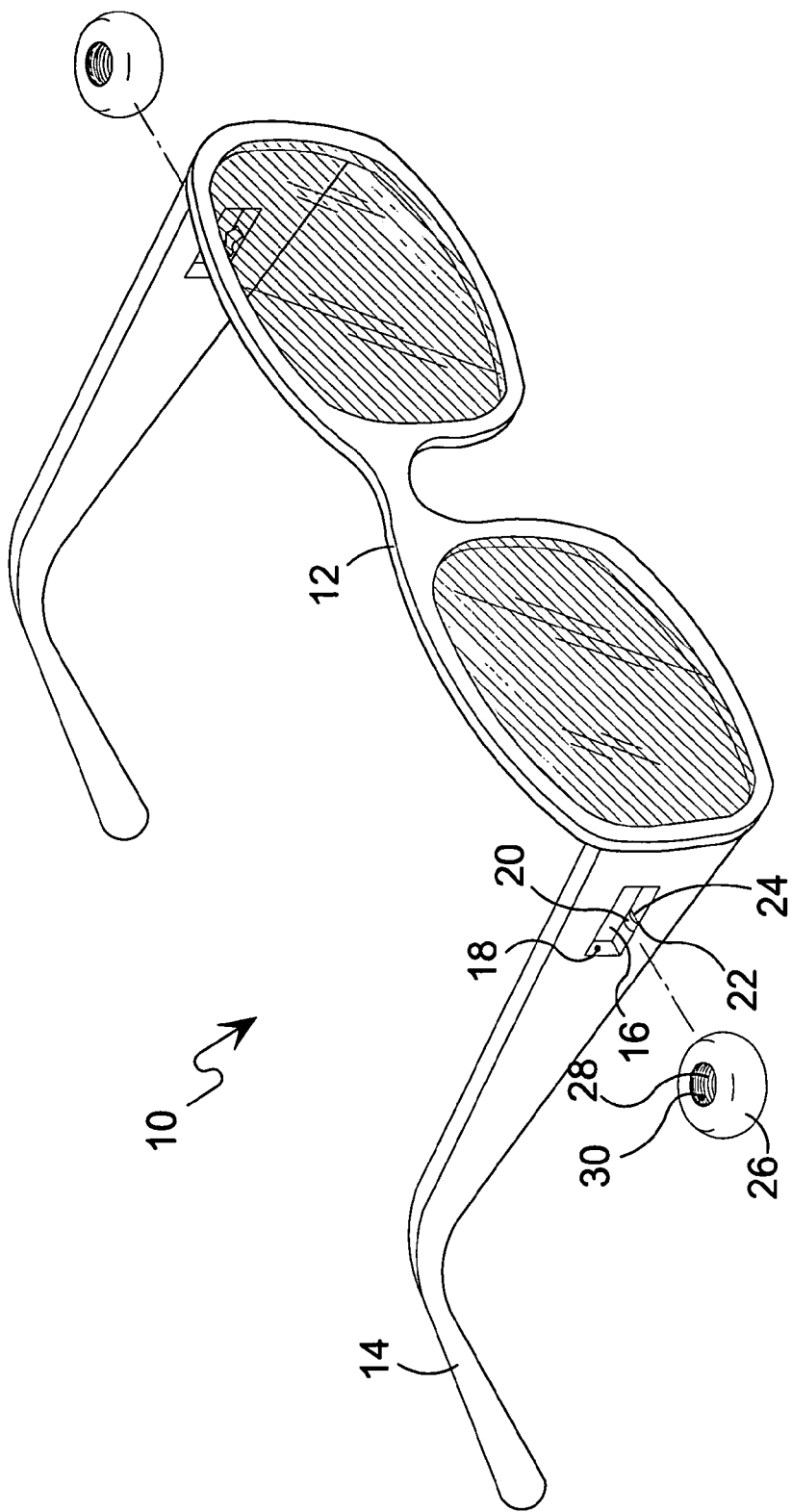
Figure 3:
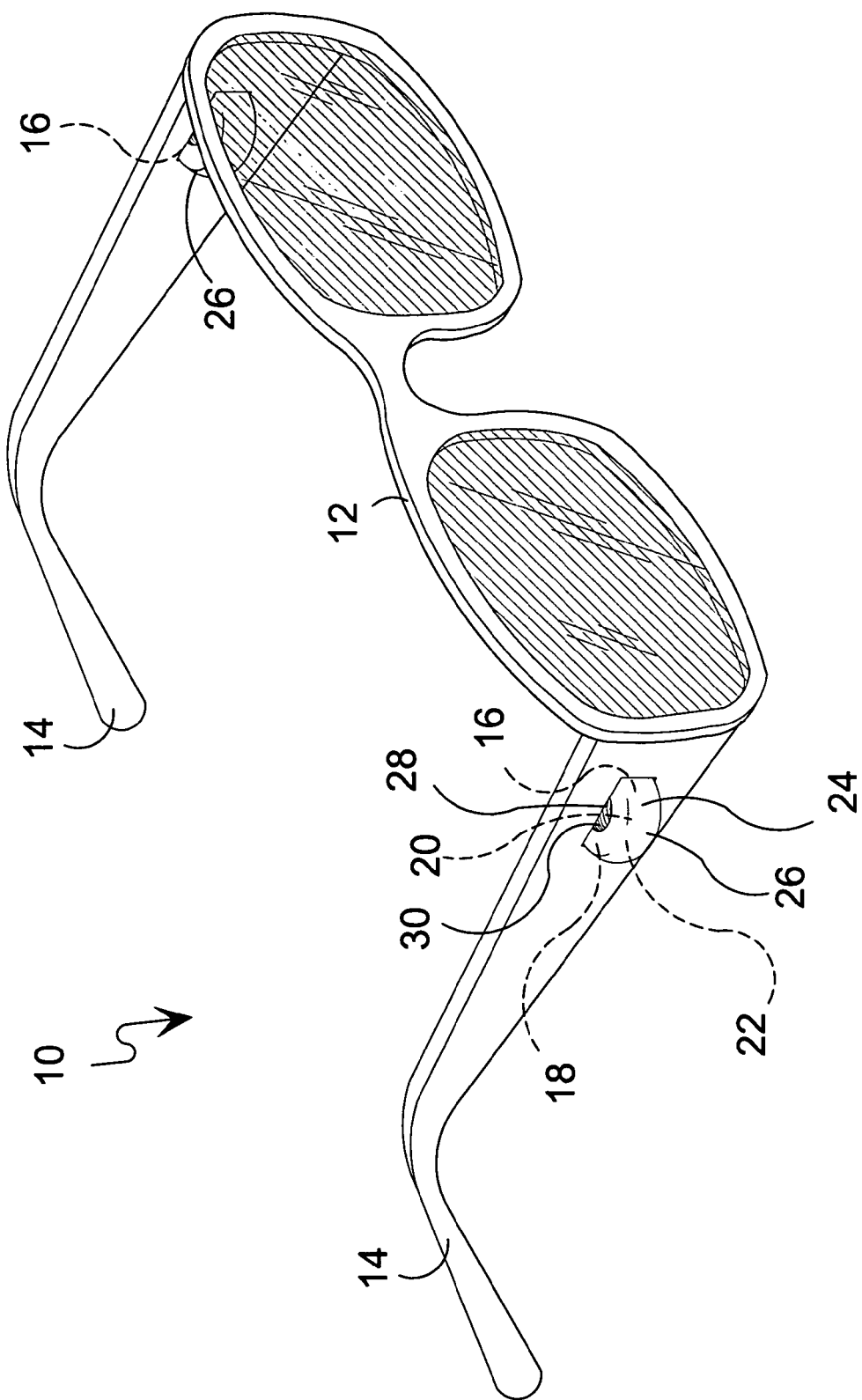
Figure 4:
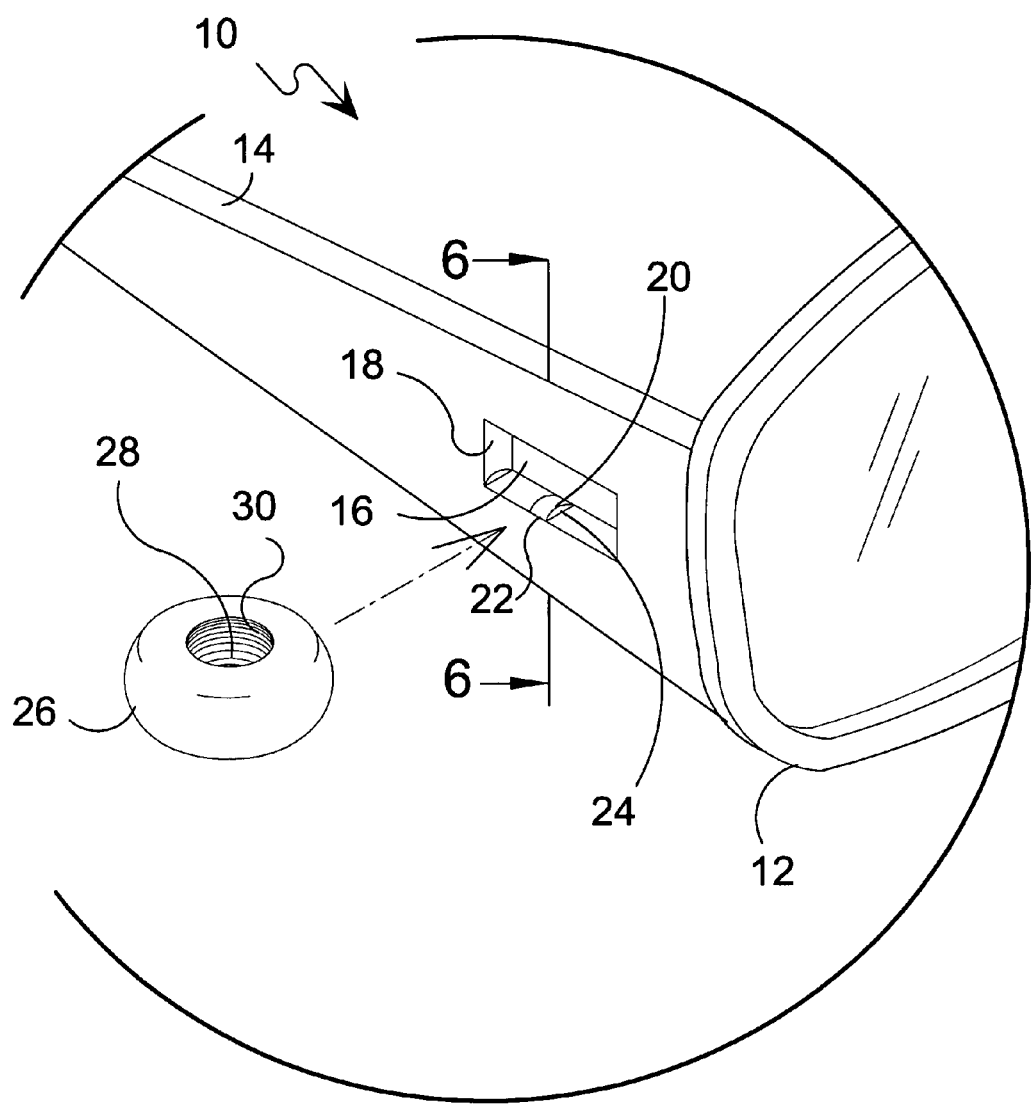
Figure 5:
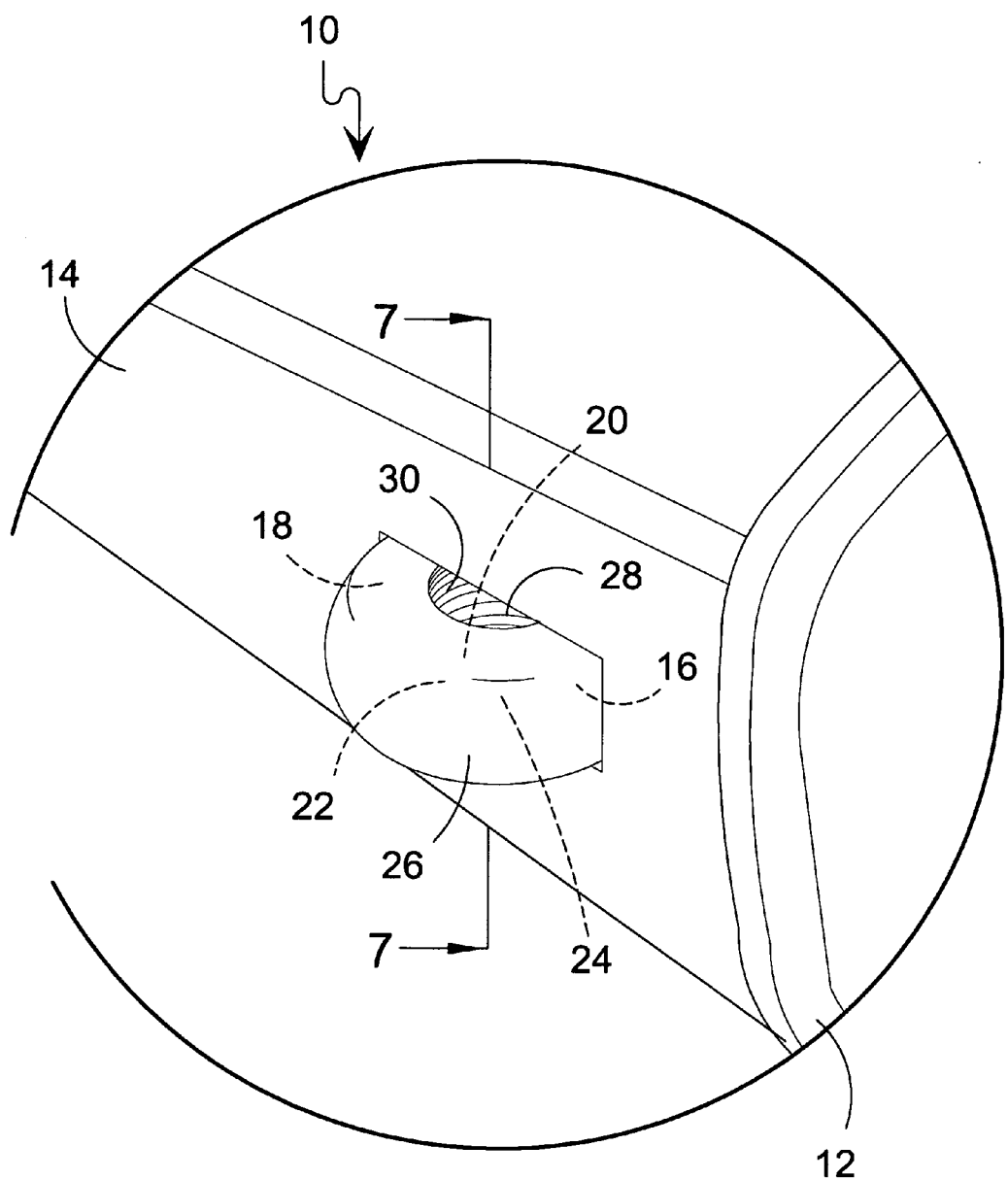
Figure 6:
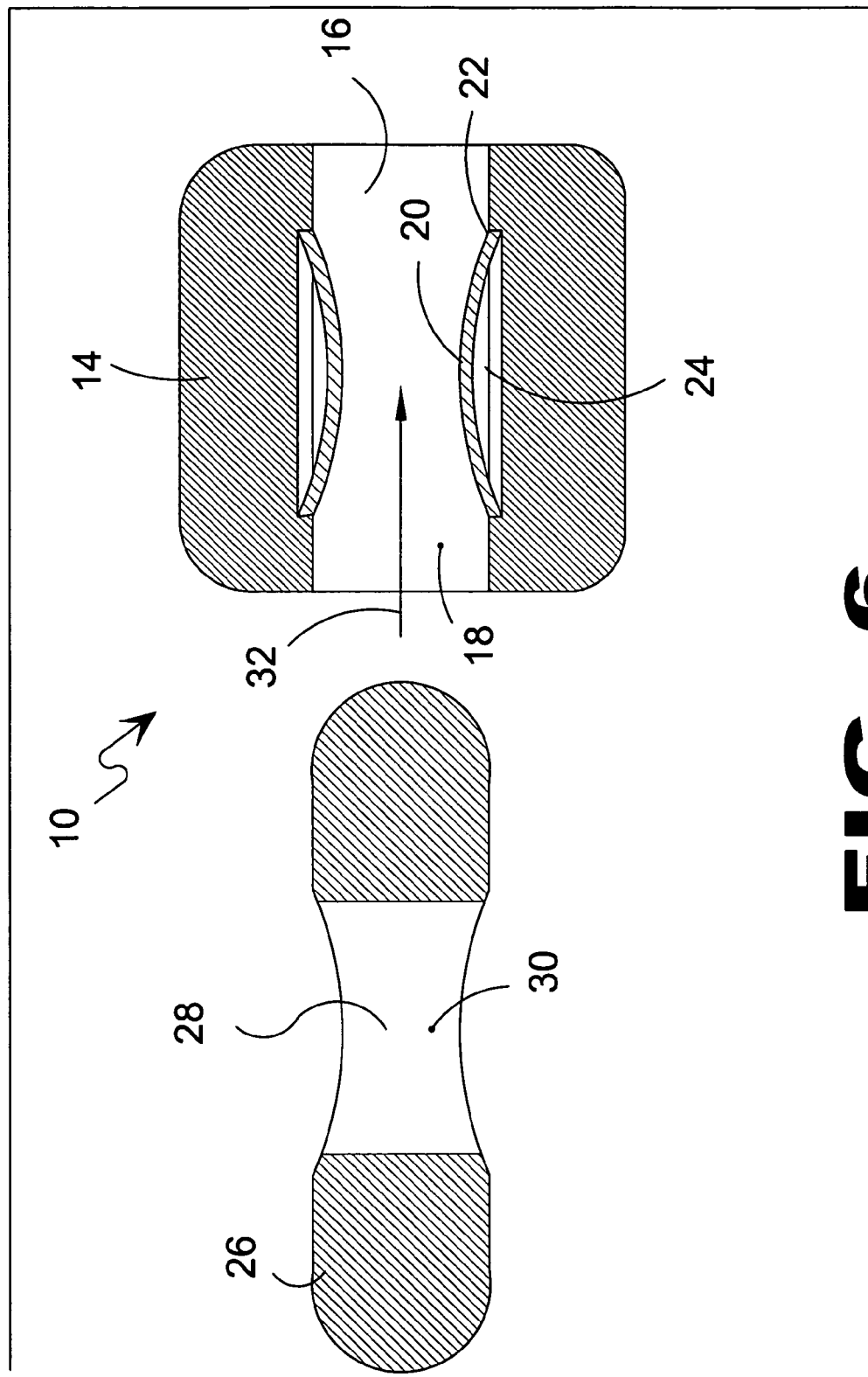
Figure 7:
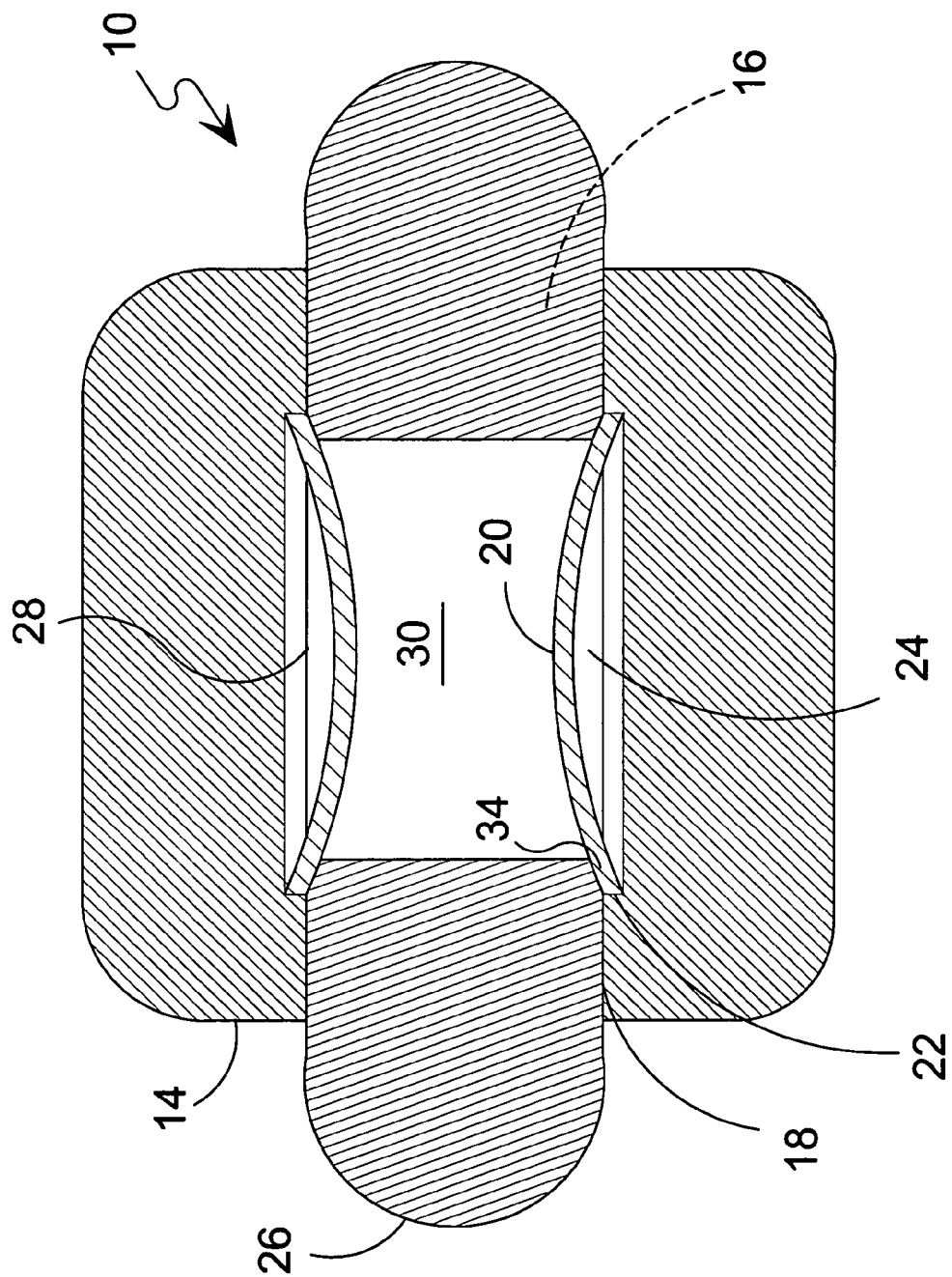
Figure 8:
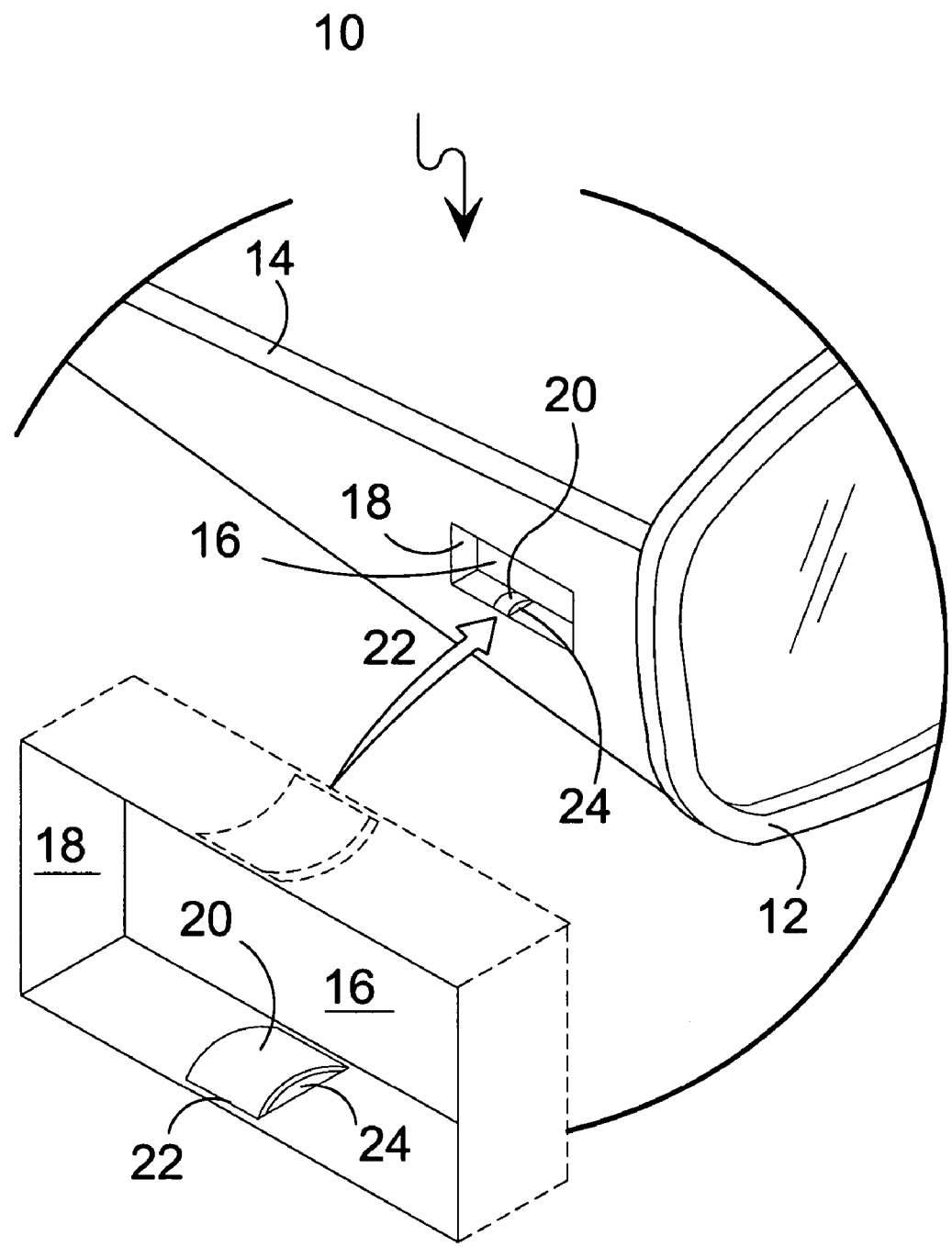
Figure 9:
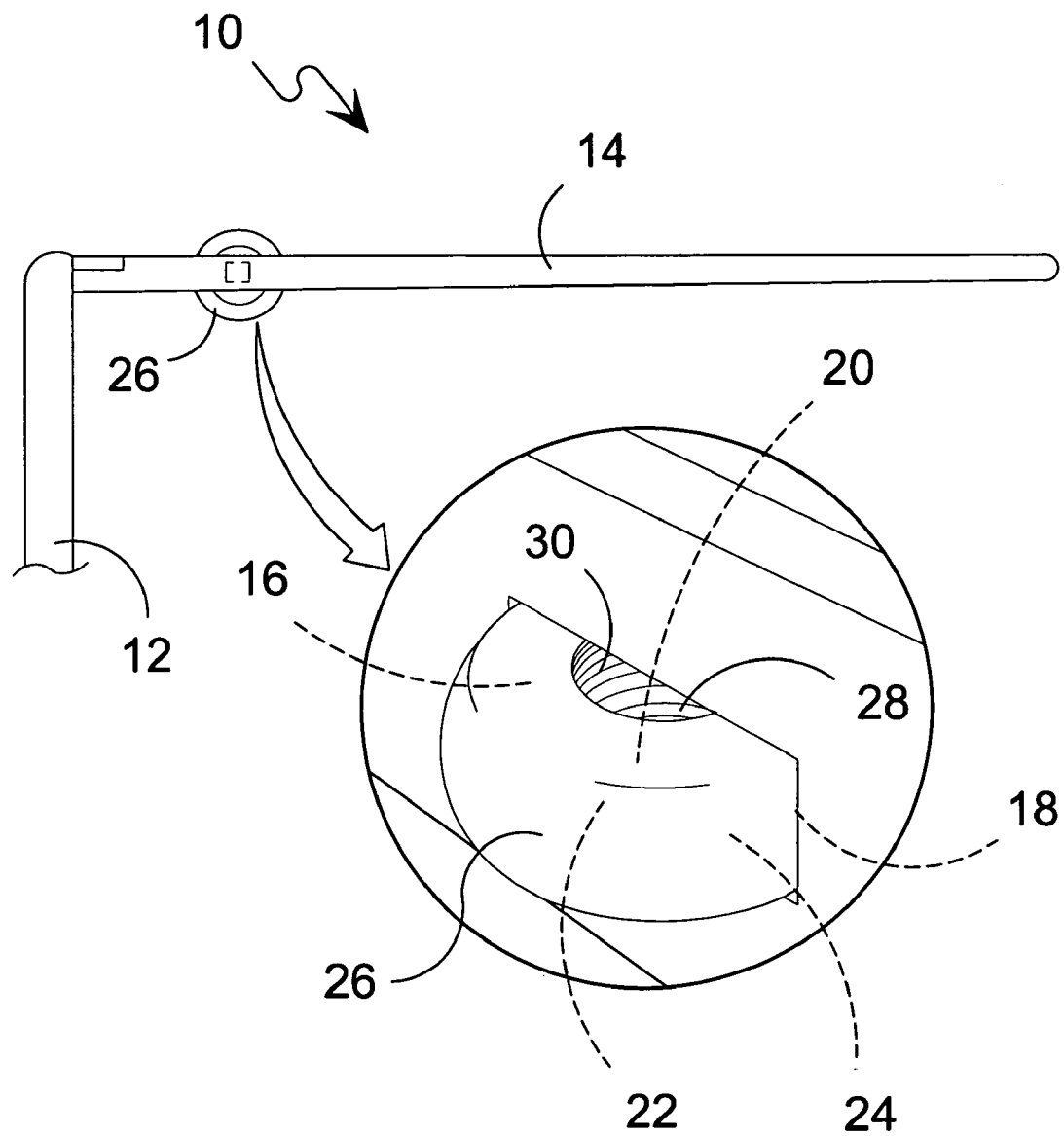
Figure 10:
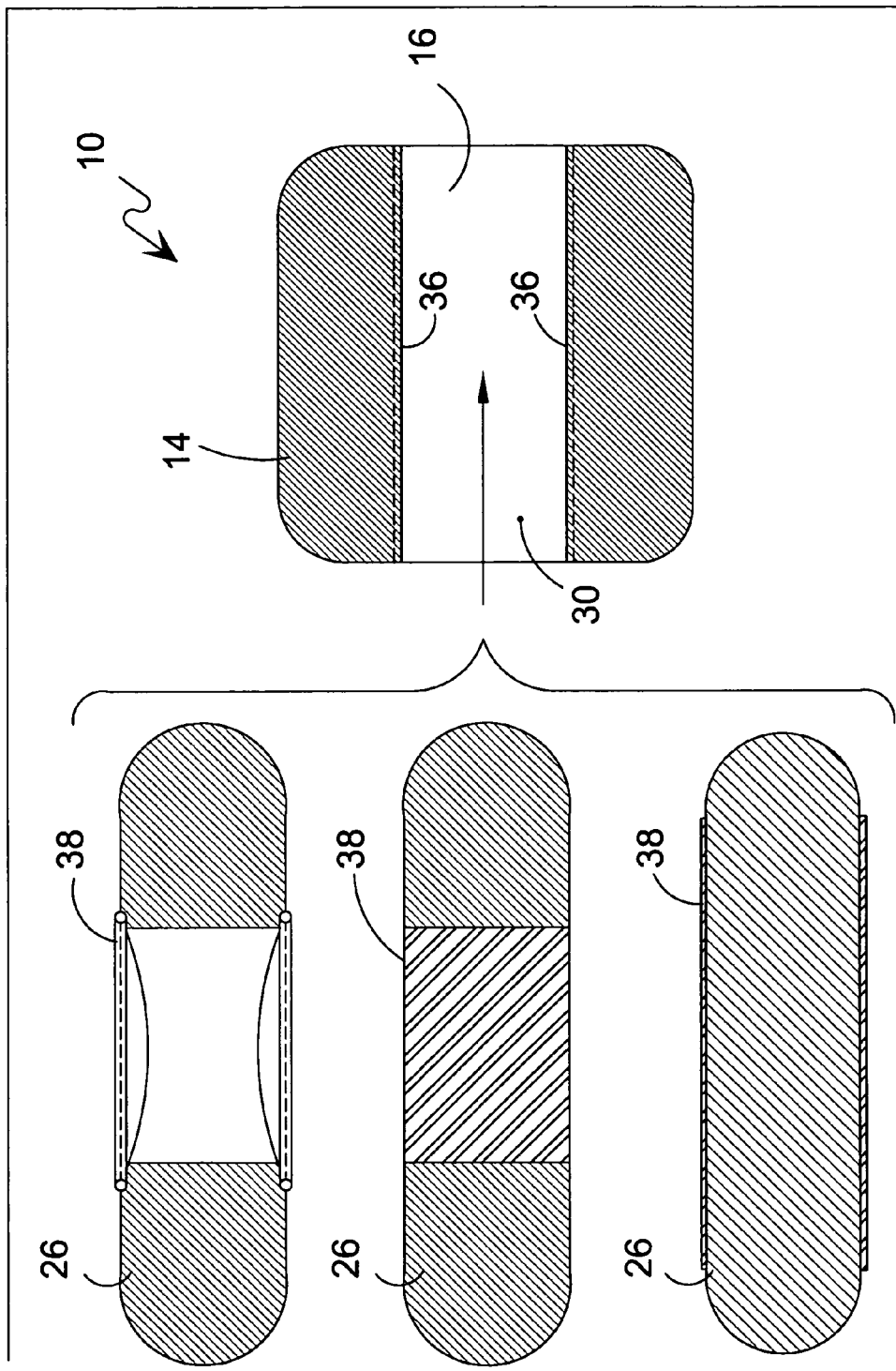
Figure 11:
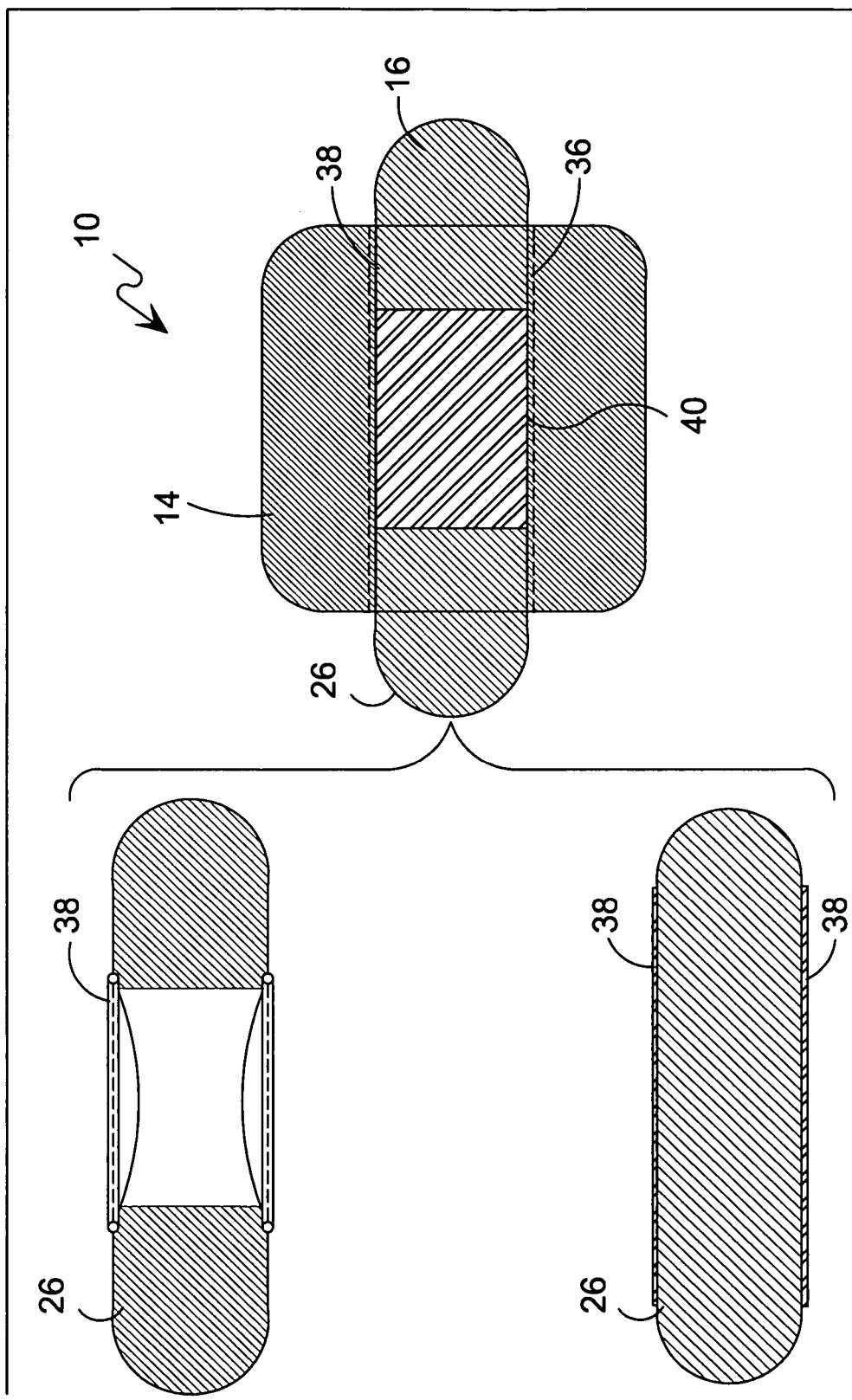
Figure 12:
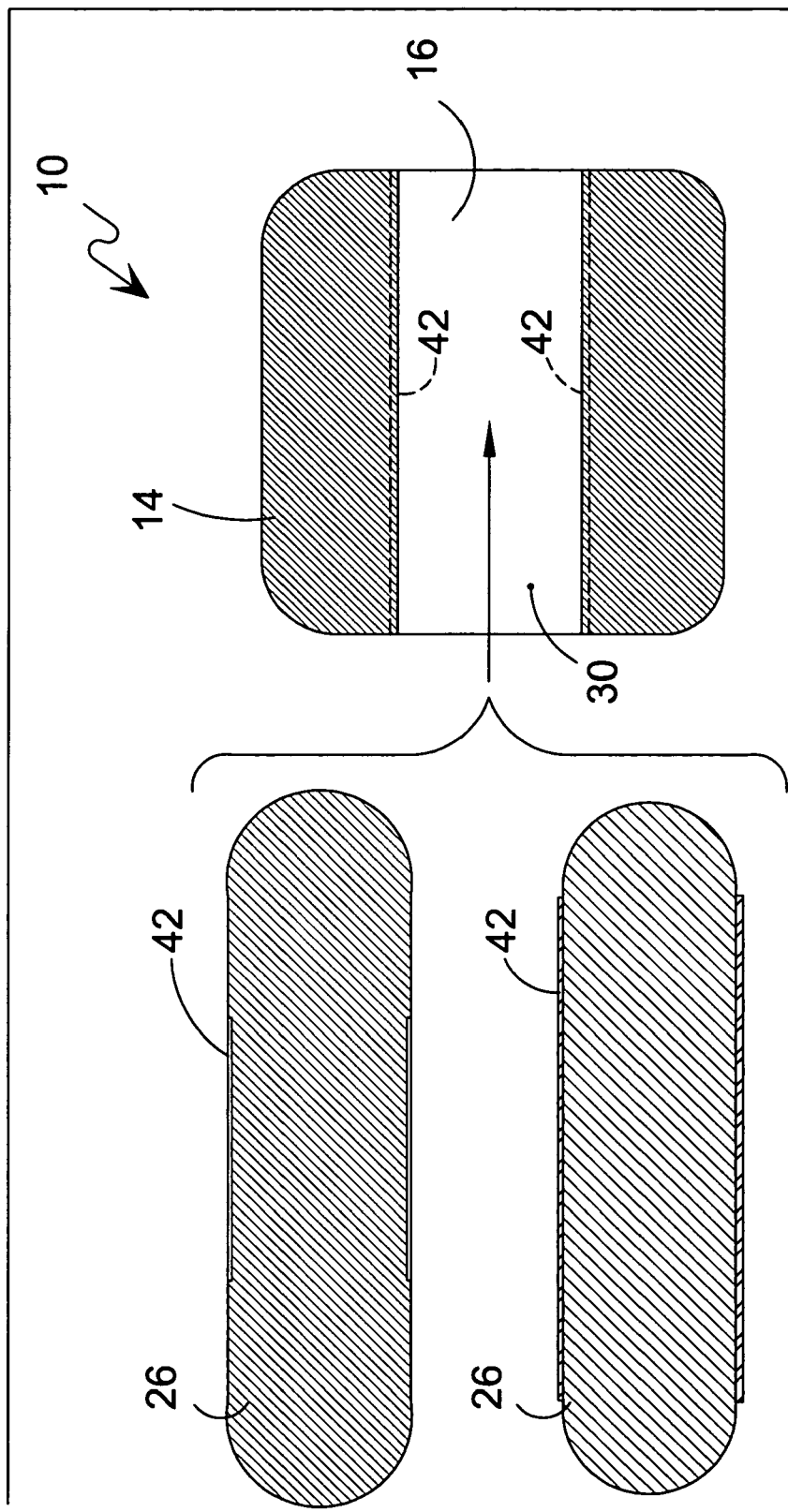

In order that the invention may be more fully understood, it will now be described, by way of example, with reference to the accompanying drawing in which:

Referring to FIG. 1, shown is an illustrative of the present invention in use;

Referring to FIG. 2, shown is an illustrative of the present invention in use;

Referring to FIG. 3, shown is an illustrated view of the present invention in use;

Referring to FIG. 4, shown is an enlarged view of the eyeglass temple;

Referring to FIG. 5, shown is an enlarged view of the eyeglass temple having a decorative article positioned therein;

Referring to FIG. 6, shown is a cross sectional view taken from FIG. 4 as indicated;

Referring to FIG. 7, shown is a sectional view of the releasably seat decorative article within the temple;

Referring to FIG. 8, shown is a detailed view of the present invention;

Referring to FIG. 9, shown is a top view of the present invention;

Referring to FIG. 10, shown is an illustrative view of the present invention;

Referring to FIG. 11, shown is an illustrative view of the present invention in use;

Referring to FIG. 12, shown is an illustrative view of the present invention; and Referring to FIG. 13, shown is an illustrative view of the present invention.

DESCRIPTION OF THE REFERENCED NUMERALS

Turning now descriptively to the drawings, in which similar reference characters denote similar elements throughout the several views, the Figures illustrate the portable search engine (POSE) of the present invention. With regard to the reference numerals used, the following numbering is used throughout the various drawing figures.

10 Eyeglass Temple Incorporating Decorative Article
12 eyeglasses
14 frame arm
16 aperture bore
18 aperture wall
20 compressible clip
22 clip base
24 clip
26 decorative article
28 article bore
30 decorative article bore wall
32 insertable
34 clip frame engagement
36 magnet
38 ferromagnetic portion
40 magnetic engagement
42 adhesive
44 adhesive engagement

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrative of the present invention in use. The eyeglass template incorporating decorative article 10 is comprised of eyeglass 12 temple 14 having throughbore 16 and wall 18 for receiving decorative article 26. As illustrated decorative article 26 has bore 28 and wall 30 that releasably engages compressible member 20 positioned within throughbore 16. Flexible compressible member 20 engages wall 18 at points 22 creating space 24 so that when decorative article 26 engages clip 20, the clip compresses providing passage until expanding upon positioning in decorative article 26 bore 28 and retained therein encompassed by wall 30 until sufficient pressure is applied to releasably engage decorative article 26 from throughbore 16.

Referring to FIG. 2, shown is an illustrative of the present invention in use. The present invention is an eyeglass template incorporating decorative article 10. Eyeglasses 12 having temple 14 with throughbore 16 therein for receiving decorative article 26. As illustrated decorative article 26 has bore 28 and wall 30 that releasably engages compressible member 20 positioned within throughbore 16. Flexible compressible member 20 engages wall 18 at points 22 creating space 24 so that when decorative article 26 engages clip 20, the clip compresses providing passage until expanding upon positioning in decorative article 26 bore 28 and retained therein encompassed by wall 30 until sufficient pressure is applied to releasably engage decorative article 26 from throughbore 16.

Referring to FIG. 3, shown is an illustrated view of the present invention in use. Illustrated is decorative article 26 releasably retained within temple aperture 16. Decorative article 26 has bore 28 and wall 30 that releasably engage compressible member 20 positioned within throughbore 16 until released by applying sufficient pressure is applied to decorative article 26 releasing it from throughbore 16.

Referring to FIG. 4, shown is an enlarged view of the eyeglass temple. The eyeglass temple 14 has throughbore 16 bounded by wall 18 forming means for receiving decorative article 26. Decorative article 26 has bore 28 and wall 30 that releasably engages compressible member 20 positioned within throughbore 16. Flexible compressible member 20 engages wall 18 at points 22 creating space 24 so that when decorative article 26 engages clip 20, the clip compresses providing passage until expanding upon positioning in decorative article 26 bore 28 and retained therein encompassed by wall 30 until sufficient pressure is applied to releasably engage decorative article 26 from throughbore 16.

Referring to FIG. 5, shown is an enlarged view of the eyeglass temple having a decorative article positioned therein. The eyeglass temple 14 has throughbore 16 bounded by wall 18 forming means for receiving decorative article 26. Decorative article 26 has bore 28 and wall 30 that releasably engages compressible member 20 positioned within throughbore 16. Flexible compressible member 20 engages wall 18 at points 22 creating space 24 so that when decorative article 26 engages clip 20, the clip compresses providing passage until expanding upon positioning in decorative article 26 bore 28 and retained therein encompassed by wall 30 until sufficient pressure is applied to releasably engage decorative article 26 from throughbore 16.

Referring to FIG. 6, shown is a cross sectional view taken from FIG. 4 as indicated. Shown is temple 14 with throughbore 16 therein for receiving decorative article 26. As illustrated decorative article 26 has bore 28 and wall 30 that releasably engages compressible member 20 positioned within throughbore 16. Flexible compressible member 20 engages wall 18 at points 22 creating space 24 so that when decorative article 26 engages clip 20, the clip compresses providing passage until expanding upon positioning in decorative article 26 bore 28 and retained therein encompassed by wall 30 until sufficient pressure is applied to releasably engage decorative article 26 from throughbore 16.

Referring to FIG. 7, shown is a sectional view of the releasably seat decorative article within the temple. Shown is temple 14 with throughbore 16 having decorative article 26 therein forming releasable engagement 34. As illustrated decorative article 26 has bore 28 and wall 30 that releasably engages compressible member 20 positioned within throughbore 16. Flexible compressible member 20 engages wall 18 at points 22 creating space 24 so that when decorative article 26 engages clip 20, the clip compresses providing passage until expanding upon positioning in decorative article 26 bore 28 and retained therein encompassed by wall 30 until sufficient pressure is applied to releasably engage decorative article 26 from throughbore 16.

Referring to FIG. 8, shown is a detailed view of the present invention. Illustrated is a detailed view of the present invention 10 comprising an eyeglass frame 144 having aperture 16 with spring-like tabs 20 to receive and lock in place designer beads 26. Said eyeglass frame apertures 16 are located within the temple frame head support arms 14. The designer beads comprise an aperture 28 to receive the spring lock tabs 14 to secure the bead 26 in position. Each bead 26 has an individual design and color and are interchangeable by the user. Another method of securing the bead within the eyeglass frame is magnetic means.

Referring to FIG. 9, shown is a top view of the present invention. Shown is a detailed view of the present invention 10, an eyeglass frame 14 having apertures 16 with spring like tabs 20 to receive and lock in place designer beads 26. Said eyeglass frame apertures 16 are located within the temple 14. The designer beads comprise an aperture 28 to receive the spring lock tabs 20 to secure the bead in position. Each bead having an individual design and color and are interchangeable 3by the user. Another method of securing the bead within the eyeglass frame is magnetic means.

Referring to FIG. 10, shown is an illustrative view of the present invention. The eyeglass temple 14 incorporating decorative article 26 provides for magnetic means for retaining decorative article 26 within temple throughbore 16. Decorative article 26 can have a ferromagnetic material 38 forming an integral part therewith. As illustrated ferromagnetic material 38 can take the form of a ring fixed to decorative article 26 aperture 28 or can form the core of decorative article 26 or can be a plate-like portion fixed to the decorative article which can be a solid structure. Temple throughbore 16 has mating magnet 36 fixedly positioned therein for engaging the ferromagnetic material 38. It should be noted that the decorative article 26 can have magnet 36 while the ferrous magnetic material is positioned within the temple throughbore 16.

Referring to FIG. 11, shown is an illustrative view of the present invention in use. The eyeglass temple 14 incorporating decorative article 26 provides for magnetic means for retaining decorative article 26 within temple throughbore 16.

Decorative article 26 can have a ferromagnetic material 38 forming an integral part therewith. As illustrated ferromagnetic material 38 can take the form of a ring fixed to decorative article 26 aperture 28 or can form the core of decorative article 26 or can be a plate-like portion fixed to the decorative article which can be a solid structure. Temple throughbore 16 has mating magnet 36 fixedly positioned therein for engaging the ferromagnetic material 38 forming magnetic engagement 40. It should be noted that the decorative article 26 can have magnet 36 while the ferrous magnetic material is positioned within the temple throughbore 16.

Referring to FIG. 12, shown is an illustrative view of the present invention. The eyeglass temple 14 incorporating decorative article 26 provides for adhesive means for retaining decorative article 26 within temple throughbore 16. Decorative article 26 can have an adhesive material 42 forming an integral part therewith. As illustrated. Adhesive material 42 can take the form of a cavity within decorative article 26 or can be a layer portion fixed to the decorative article which can be a solid structure. Temple throughbore 16 can also incorporate an adhesive 42 for fixedly positioned decorative article 26 therein.

Referring to FIG. 13, shown is an illustrative view of the present invention. The eyeglass temple 14 incorporating decorative article 26 provides for adhesive means for retaining decorative article 26 within temple throughbore 16. Decorative article 26 can have an adhesive material 42 forming an integral part therewith. As illustrated. Adhesive material 42 can take the form of a cavity within decorative article 26 or can be a layer portion fixed to the decorative article which can be a solid structure. Temple throughbore 16 can also incorporate an adhesive 42 for fixedly positioned decorative article 26 therein forming adhesive bond 44.

What is claimed is new and desired to be protected by Letters Patent is set forth in the appended claims:

1. An eyeglass frame comprising:
   a frame arm extending from one side of said eyeglass frame;
   a rectangular aperture bore in said frame arm extending from an outer surface thereof to an inner surface thereof;
   said bore framed by upper, lower and side flat walls;
   a single decorative bead having substantially flattened upper and lower sides;
   said decorative bead being sized to snap into said rectangular aperture bore with outer surfaces thereof extending out from the outer and inner surfaces of said frame arm; and
   means within said rectangular aperture bore to retain said decorative bead.

2. The eyeglass frame as recited in claim 1, wherein said frame has a second frame arm and wherein said rectangular aperture bore is formed in both of said frame arms.

3. The eyeglass frame as recited in claim 1, wherein said decorative bead is removable thereby enabling the placement of a desired decorative bead from a plurality of decorative beads.

4. The eyeglass frame as recited in claim 1, wherein said bead is bonded in said rectangular aperture bore using an adhesive positioned on at least one of the throughbore walls.

5. The eyeglass frame as recited in claim 1, wherein said decorative bead is releasably positioned within said rectangular aperture bore.

6. The eyeglass frame as recited in claim 5, wherein said decorative bead is magnetically positioned within said rectangular aperture bore.

7. The eyeglass frame as recited in claim 6, wherein said decorative bead incorporates a ferromagnetic portion.

8. The eyeglass frame as recited in claim 7, wherein said rectangular aperture bore incorporates a magnet portion for releasably engaging said ferromagnetic portion of said decorative bead.

9. The eyeglass flame as recited in claim 6, wherein said decorative bead incorporates a magnet.

10. The eyeglass frame as recited in claim 9, wherein said rectangular aperture bore incorporates a ferromagnetic portion for releasably engaging the magnet of the decorative bead.

11. The eyeglass frame as recited in claim 5, wherein said rectangular aperture bore incorporates a compressible flexible member.

12. The eyeglass frame as recited in claim 11, wherein said rectangular aperture bore has a second compressible flexible member.

13. The eyeglass frame as recited in claim 11, wherein said decorative bead incorporates a cavity for receiving the compressible flexible member thereby releasably fixing the decorative bead within the rectangular aperture bore.

14. The eyeglass frame as recited in claim 1, wherein said decorative bead is taken from a list of a bead, semi-precious stone and precious stone.

15. An eyeglass flame comprising:
   a frame arm extending from one side of said eyeglass frame;
   a rectangular aperture bore in said frame arm extending from an outer surface thereof to an inner surface thereof,
   said bore framed by upper, lower and side flat walls;
   an arc shaped spring member mounted in a recess in each of said upper and lower flat walls with ends of spring member butting against side walls of said recess;
   a single decorative bead having substantially flattened upper and lower sides with central portions of said decorative bead being curved toward each other;
   a central bore extending between said upper and lower sides;
   said decorative bead being unenclosed and sized to snap into said rectangular aperture bore with said spring member curving partially into said central bore of said bead for retaining said bead within said rectangular aperture bore and with outer surfaces thereof extending out beyond the outer and inner surfaces of said frame arm; and
   whereby said decorative bead is removable from said rectangular aperture bore by application of pressure on said bead.

* * * * *